Oct. 5, 1954 C. D. KEITH 2,690,961
CHEMICAL MANUFACTURE
Filed May 19, 1951
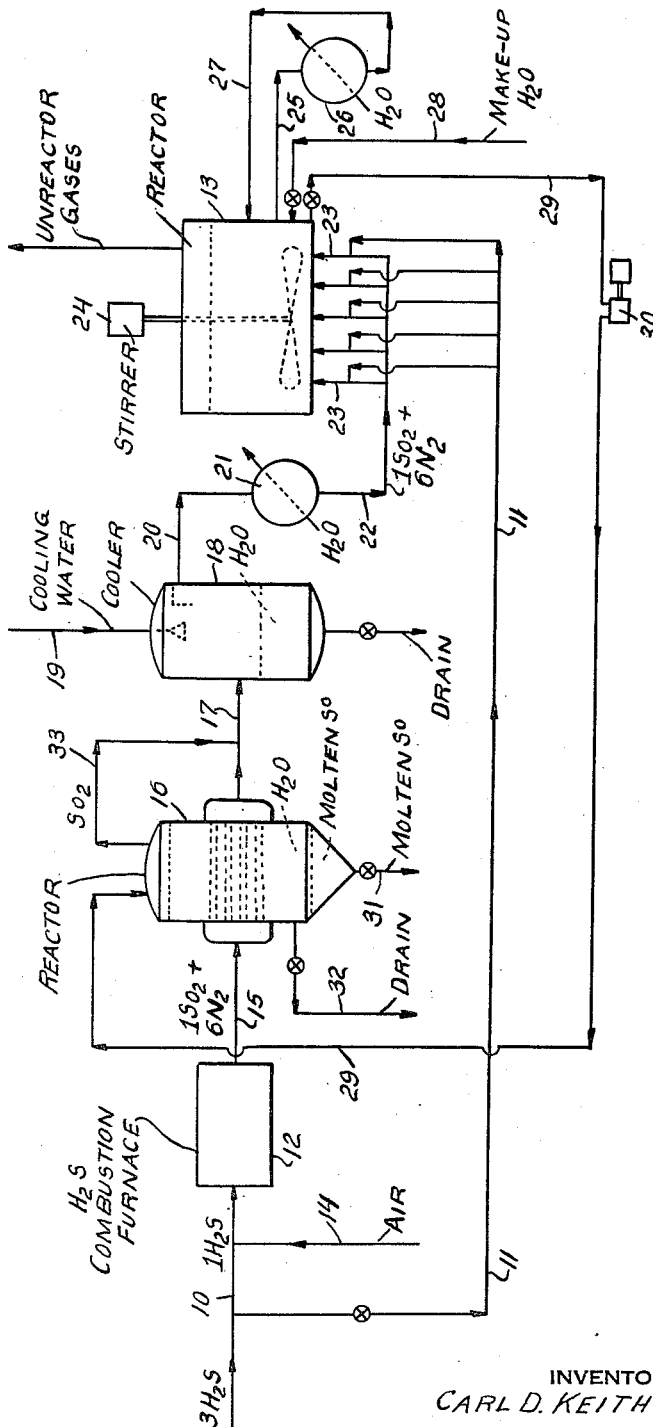
INVENTOR
CARL D. KEITH
BY
Adams, Forward and McLean
ATTORNEYS

Patented Oct. 5, 1954

2,690,961

UNITED STATES PATENT OFFICE 2,690,961

CHEMICAL MANUFACTURE

Carl D. Keith, Munster, Ind., assignor to Sinclair Refining Company, New York, N. Y., a corporation of Maine Application May 19, 1951, Serial No. 227,222

2 Claims. (Cl. 23—225)

My invention relates to the recovery of sulfur values in the form of elemental sulfur from hydrogen sulfide-rich gases. More particularly, my invention relates to the recovery of sulfur from sour gases in a combined operation in which a mixture of colloidal sulfur and polythionic acids are produced in an aqueous reaction medium and the effluent is reacted separately in the liquid phase under elevated temperature to produce molten sulfur. My invention provides a simplified reaction system requiring very low capital investment which is particularly adapted to the recovery of sulfur values from the hydrogen sulfide available in oil refinery gases.

According to my invention, the hydrogen sulfide gas stream, after removal in one of the usual ways from hydrocarbon gases, is first oxidized in a partial combustion zone with oxygen or air in known manner to produce a mixture of hydrogen sulfide and sulfur dioxide in the approximate ratio of 2 to 1. The reaction temperature is about 1700° to 2000° F. The resulting gas stream is cooled by passage through a molten sulfur reactor in indirect heat exchange with the reaction mixture therein. The temperature is adjusted to about 100° to 150° F. and then the gas stream is reacted by dispersion in an aqueous medium at about 70° to 130° F. Under the reaction conditions, oxidation of the hydrogen sulfide by the sulfur dioxide is effected and a dispersion of colloidal sulfur and polythionic acids in water is produced. The mixture is converted to molten sulfur by continuous withdrawal from the colloidal sulfur reactor and introduction to the molten sulfur reactor where the mixture is reacted in the liquid phase at about 250° to 350° F. Sufficient pressure is maintained to keep the aqueous mixture in the liquid phase and molten sulfur is separated from the liquid reaction phase. Advantageously, unreacted gases are recovered from the molten sulfur reactor and recycled to the reaction by addition to the gas stream to the colloidal sulfur reactor.

My invention will be better understood by reference to the accompanying drawing which illustrates the flow in simplified and diagrammatic form. The hydrogen sulfide-rich gas stream is divided by means of lines 10 and 11 to charge a portion of the hydrogen sulfide to combustion furnace 12 and a portion of the hydrogen sulfide to colloidal sulfur reactor 13, respectively.

Air is introduced with the hydrogen sulfide charge to combustion furnace 12 through connection 14 in an amount sufficient to oxidize the hydrogen sulfide to sulfur dioxide. The hot gas stream from combustion furnace 12 is passed by means of connection 15 to molten sulfur reactor 16. The hot gas stream is conducted through reactor 16 in indirect heat exchange with the reactants therein and passed by means of connection 17 to a separate cooler 18 where the gas stream is quenched by a spray of cooling water through line 19. The effluent gas stream is passed through line 20 and cooler 21 where the temperature is adjusted to less than about 150° F. and then by line 22 to colloidal sulfur reactor 13. The sulfur dioxide charge is mixed with hydrogen sulfide from line 11 in the ratio of about 2 moles of hydrogen sulfide to 1 mole of sulfur dioxide in manifolding system 23. The gas mixture is continuously bubbled into a body of aqueous medium which is maintained in a state of agitation in reactor 13 by means of stirrer 24. The temperature of the aqueous reaction medium is controlled by recycling a portion of the liquor through connection 25, cooler 26 and line 27. Make-up water is added through line 28.

A portion of the aqueous reaction medium through reactor 13 is continuously withdrawn through line 29 and passed by means of pump 30 to molten sulfur reactor 16. Molten sulfur is produced in reactor 16, is withdrawn from the bottom of the reactor through line 31 and excess water is withdrawn through line 32. Unreacted gases from reactor 16 which predominate in sulfur dioxide are returned to the system by connection 33 to line 17.

In operation, the hydrogen sulfide combustion furnace operates at about 1700° to 2000° F. If desired, the hydrogen sulfide gas may be handled as a single stream by partial oxidation in furnace 12, in which case only enough air is added through connection 14 to oxidize about one-third of the hydrogen sulfide to sulfur dioxide. The ratio of hydrogen sulfide to sulfur dioxide may be varied somewhat but I prefer to operate with at least one mole or an excess of sulfur dioxide to two moles of hydrogen sulfide. The molten sulfur reactor must be operated at a temperature above 248° F., the melting point of amorphous sulfur. I prefer an operating temperature of about 275° F. The reaction is maintained in the liquid phase by application of superatmospheric pressure. In the reactor, suspended elemental sulfur, largely in the colloidal state, is converted to molten sulfur and the polythionic acids are converted to molten sulfur, sulfur dioxide and sulfuric acid. The conversion of the polythionic acids to elemental sulfur is about 50 per cent. The sulfuric acid produced passes to drain with the excess water removed from reactor 16 while the sulfur dioxide may be recycled, if desired.

The reaction of the hydrogen sulfide and sulfur dioxide mixture in the colloidal sulfur reactor is maintained in the aqueous medium and at a temperature of about 70° to 130° F. Advantageously the temperature is at least 100° F. and within the range 100° to 115° F. The sulfur concentration in the aqueous reaction medium of reactor 13 should be built up to about 2 per cent before withdrawal to the molten sulfur reactor 16. The sulfur concentration may be varied between about 2 and 50 percent. Conversions in the colloidal sulfur reactor 13 exceed 90 per cent.

The process of my invention will be further illustrated by reference to the following examples:

Example I

Hydrogen sulfide at 71.56 liters per hour, sulfur dioxide at 41.2 liters per hour and nitrogen at 213.1 liters per hour are mixed and bubbled into a reaction medium comprising 8 liters of deionized water maintained in a 12-liter fluted flask equipped with a stirrer. The temperature of the reaction is maintained at 130° F. The feed gases are mixed and bubbled into the reaction medium at a point where the stirrer breaks up any large bubbles and insures thorough dispersion of the reactants. After a period of 5 hours, the analysis of the reaction mixture is as follows:

|  | Per cent |
|---|---|
| Total sulfur | 5.88 |
| Elemental sulfur | 5.27 |
| Polythionic acids (calculated as $H_2S_4O_6$) | 1.05 |
| Sulfur dioxide | 0.03 |

The reaction mixture then is heated to 275° F. under pressure and the aqueous suspension of elemental sulfur and approximately 50 per cent of the sulfur available in the polythionic acids is converted to molten sulfur. Under the conditions of the above example, about 63 per cent conversion to brimstone is obtained, calculating per cent conversion from the following equation:

Percent Conversion=

$$\frac{\text{g's. } S^0 + \text{g's. } S^0 \text{ from polythionic acids*}}{\text{g's. total S in feed of } SO_2 + H_2S} \times 100$$

* Based upon 50% recovery of sulfur from polythionic acids.

Example II

Following the method of Example I, but at a reaction temperature of 115° F., a reaction mixture after 5 hours having the following analysis is obtained:

|  | Per cent |
|---|---|
| Total sulfur | 7.26 |
| Elemental sulfur | 6.50 |
| Polythionic acids (calculated as $H_2S_4O_6$) | 1.31 |
| Sulfur dioxide | 0.04 |

Reaction of the mixture at 275° F. to produce molten sulfur results in a conversion to brimstone of about 76 per cent.

Example III

Following the method of Example I, but at a reaction temperature of 70° F., a reaction mixture after 5 hours having the following analysis is obtained:

|  | Per cent |
|---|---|
| Total sulfur | 7.53 |
| Elemental sulfur | 6.59 |
| Polythionic acids (calculated as $H_2S_4O_6$) | 1.60 |
| Sulfur dioxide | 0.06 |

Reaction of the mixture at 275° F. to produce molten sulfur results in a conversion to brimstone of about 80 per cent.

Example IV

This example is conducted according to the method of Example I but starting in the initial stage at a temperature of less than 100° F. and increasing the temperature to a maximum of 110° F. by the heat of reaction. With a feed gas composition to the first stage of 2 $H_2S$: 1.15 $SO_2$: 6 $N_2$, the feed rates of 71.56 liters per hour of hydrogen sulfide, 41.2 liters per hour of sulfur dioxide and 213.1 liters per hour of nitrogen, the following reaction mixture is obtained after a 5-hour run:

|  | Per cent |
|---|---|
| Total sulfur | 7.05 |
| Elemental sulfur | 6.29 |
| Polythionic acids (calculated as $H_2S_4O_6$) | 1.27 |
| Sulfur dioxide | 0.07 |

Under the above conditions, the per cent conversion to brimstone after reaction of the mixture at 275° F. to produce molten sulfur is about 79 per cent.

Example V

This example is conducted according to the method of Example I but starting in the initial stage at a temperature of less than 100° F. and increasing the temperature to a maximum of 110° F. by the heat of reaction. With a feed gas composition to the first stage of 2 $H_2S$: 1 $SO_2$: 6 $N_2$, the feed rates of 71.56 liters per hour of hydrogen sulfide, 35.78 liters per hour of sulfur dioxide and 213.1 liters per hour of nitrogen, the following reaction mixture is obtained after a 5-hour run:

|  | Per cent |
|---|---|
| Total sulfur | 7.39 |
| Elemental sulfur | 6.84 |
| Polythionic acids (calculated as $H_2S_4O_6$) | 0.94 |
| Sulfur dioxide | 0.04 |

Under the above conditions, the per cent conversion to brimstone after reaction of the mixture at 275° F. to produce molten sulfur is about 84 per cent.

Example VI

This example is conducted according to the method of Example I but starting in the initial stage at a temperature of less than 100° F. and increasing the temperature to a maximum of 110° F. by the heat of reaction. With a feed gas composition to the first stage of 2.3 $H_2S$: 1 $SO_2$: 6 $N_2$, the feed rates of 82.4 liters per hour of hydrogen sulfide, 35.78 liters per hour of sulfur dioxide and 213.1 liters per hour of nitrogen, the following reaction mixture is obtained after a 5-hour run:

|  | Per cent |
|---|---|
| Total sulfur | 7.75 |
| Elemental sulfur | 7.51 |
| Polythionic acids (calculated as $H_2S_4O_6$) | 0.42 |
| Sulfur dioxide | 0.01 |

Under the above conditions, the per cent conversion to brimstone after reaction of the mixture at 275° F. to produce molten sulfur is about 78 per cent.

I claim:

1. In the recovery of elemental sulfur from a hydrogen sulfide-rich gas stream, the method which comprises partially oxidizing hydrogen sulfide with air to produce a mixture of hydrogen sulfide and sulfur dioxide in the gas stream in the approximate ratio of 2 to 1, cooling the gas stream by passing it through a molten sulfur reactor in indirect heat transfer with the reactants therein, adjusting the temperature of the gas stream to about 100° to 150° F., reacting the mixture of hydrogen sulfide and sulfur dioxide in aqueous medium at a temperature of about 70° to 130° F. in a second reaction vessel, withdrawing the aqueous reaction mixture from the second reaction vessel and reacting it in the molten sulfur reactor in the liquid phase at a temperature of about 250° to 350° F. and recovering molten sulfur from the liquid reaction phase.

2. The method of claim 1 in which unreacted gases are recovered from the molten sulfur reactor and recycled to the reaction by addition to the gas stream to the second reaction vessel.

References Cited in the file of this patent

UNITED STATES PATENTS

| Number | Name | Date |
|---|---|---|
| 1,546,048 | Vogel | July 14, 1925 |
| 1,832,448 | Coleman et al. | Nov. 17, 1931 |
| 1,901,249 | Lincoln | Mar. 14, 1933 |
| 1,904,424 | Edmonds et al. | Apr. 18, 1933 |
| 1,925,198 | Melvill | Sept. 5, 1933 |
| 2,389,810 | Odell et al. | Nov. 27, 1945 |
| 2,563,437 | Townend et al. | Aug. 7, 1951 |